United States Patent
Liu et al.

(10) Patent No.: US 7,976,784 B2
(45) Date of Patent: Jul. 12, 2011

(54) METHODS AND SYSTEMS INCLUDING CO OXIDATION CATALYST WITH LOW NO TO $NO_2$ CONVERSION

(75) Inventors: Xinsheng Liu, Edison, NJ (US); Xinyi Wei, Princeton, NJ (US); Pascaline Tran, Holmdel, NJ (US); Gerard Lapadula, Piscataway, NJ (US)

(73) Assignee: BASF Corporation, Florham Park, NJ (US)

( * ) Notice: Subject to any disclaimer, the term of this patent is extended or adjusted under 35 U.S.C. 154(b) by 568 days.

(21) Appl. No.: 11/958,936

(22) Filed: Dec. 18, 2007

(65) Prior Publication Data

US 2009/0155151 A1 Jun. 18, 2009

(51) Int. Cl.
*B01D 50/00* (2006.01)
*B01D 53/34* (2006.01)
*B01J 23/00* (2006.01)
*B01J 21/00* (2006.01)
*B01J 20/00* (2006.01)

(52) U.S. Cl. ........ 422/177; 422/180; 502/326; 502/339; 502/349; 502/439; 502/527.19

(58) Field of Classification Search ............ 502/327, 502/332, 333, 339, 349, 439, 326; 422/177, 422/180
See application file for complete search history.

(56) References Cited

U.S. PATENT DOCUMENTS

| | | | |
|---|---|---|---|
| 4,054,407 A | 10/1977 | Carrubba et al. | |
| 4,961,917 A | 10/1990 | Byrne | |
| 5,104,629 A | 4/1992 | Dreschler | |
| 5,108,977 A | 4/1992 | Yoshida et al. | |
| 5,727,385 A | 3/1998 | Hepburn | |
| 6,033,640 A | 3/2000 | White | |
| 6,117,813 A | 9/2000 | McCauley et al. | |
| 6,455,463 B1 | 9/2002 | LaBarge et al. | |
| 6,489,264 B1 | 12/2002 | Isupova et al. | |
| 6,528,029 B1 * | 3/2003 | Dettling et al. | ............... 423/210 |
| 6,569,392 B1 * | 5/2003 | Li et al. | ..................... 423/213.5 |
| 6,727,202 B2 | 4/2004 | Deeba et al. | |
| 6,797,663 B2 | 9/2004 | Watanabe et al. | |

(Continued)

FOREIGN PATENT DOCUMENTS

EP 1570903 9/2005

OTHER PUBLICATIONS

Milt, V G et al., "Abatement of diesel exhaust pollutants: NOx adsorption on Co,Ba, K/CeO2 catalysts", *Journal of Catalysis 220* (2003), (2003), pp. 424-432.

(Continued)

*Primary Examiner* — Cam N Nguyen
(74) *Attorney, Agent, or Firm* — Scott S. Servilla; Diehl Servilla LLC; Melanie L. Brown (57) ABSTRACT

Catalysts, catalyst systems, and methods for removing ammonia and/or carbon monoxide in flue gases are provided where ammonia is used with a selective catalytic reduction catalyst for reducing oxides of nitrogen. An oxidation catalyst is utilized, which comprises particulate platinum or platinum/palladium dispersed on zirconia particles, the particulate platinum or platinum/palladium having an average particle size less than about 10 nm. The catalyst is effective to convert less than 20% of NO to $NO_2$ passing through the oxidation catalyst.

11 Claims, 5 Drawing Sheets

U.S. PATENT DOCUMENTS

| | | | |
|---|---|---|---|
| 6,833,125 B2 | 12/2004 | Cremona et al. | |
| 7,045,056 B2 | 5/2006 | Kelkar et al. | |
| 7,078,004 B2 | 7/2006 | Voss et al. | |
| 7,265,076 B2 * | 9/2007 | Taguchi et al. | 502/326 |
| 7,314,846 B2 * | 1/2008 | Kuno | 502/326 |
| 7,316,806 B2 * | 1/2008 | Okuno et al. | 423/651 |
| 7,345,214 B2 * | 3/2008 | Xu et al. | 585/752 |
| 7,465,690 B2 * | 12/2008 | Yan | 502/325 |
| 7,563,744 B2 * | 7/2009 | Klein et al. | 502/326 |
| 7,605,108 B2 * | 10/2009 | Wakamatsu et al. | 502/326 |
| 7,611,680 B2 * | 11/2009 | Jia et al. | 422/177 |
| 7,638,460 B2 * | 12/2009 | Nakamura et al. | 502/326 |
| 7,713,908 B2 * | 5/2010 | Yamamoto et al. | 502/300 |
| 7,718,567 B2 * | 5/2010 | Hanaki et al. | 502/304 |
| 7,722,845 B2 * | 5/2010 | Caudle et al. | 423/239.1 |
| 2003/0202927 A1 | 10/2003 | Minkara et al. | |
| 2005/0147550 A1 | 7/2005 | Furbeck et al. | |
| 2005/0176580 A1 * | 8/2005 | Osaka et al. | 502/339 |
| 2006/0029534 A1 | 2/2006 | Eiteneer et al. | |
| 2006/0120936 A1 | 6/2006 | Alive et al. | |
| 2006/0182676 A1 | 8/2006 | Tran et al. | |
| 2007/0099796 A1 * | 5/2007 | Nakamura et al. | 502/304 |
| 2007/0269353 A1 * | 11/2007 | Li et al. | 422/176 |
| 2008/0003155 A1 * | 1/2008 | Jia et al. | 423/213.5 |
| 2008/0072575 A1 * | 3/2008 | Yan | 60/284 |
| 2008/0085231 A1 * | 4/2008 | Vitse et al. | 423/239.1 |
| 2008/0124264 A1 * | 5/2008 | Ikeda et al. | 423/213.5 |
| 2008/0127638 A1 * | 6/2008 | Vaarkamp et al. | 60/297 |
| 2008/0131345 A1 * | 6/2008 | Vitse et al. | 423/239.1 |
| 2008/0132405 A1 * | 6/2008 | Patchett et al. | 502/74 |
| 2008/0141661 A1 * | 6/2008 | Voss et al. | 60/295 |
| 2008/0318769 A1 * | 12/2008 | Wakamatsu et al. | 502/303 |
| 2009/0088320 A1 * | 4/2009 | Kikuchi et al. | 502/303 |

OTHER PUBLICATIONS

Tikhomirov, Kirill et al., "Influence of potassium doping on the activity and the sulfer poisoning resistance of soot oxidation catalysts", *Catalysis Letters* vol. 109, Nos. 1-2, Jun. 2006, pp. 49-53.
PCT/US2007/084631—Search Report—Apr. 23, 2008.
PCT/US2007/084631—Written Opinion—Apr. 23, 2008.
USPTO Non-Final Office Action mailed Dec. 22, 2008 for U.S. Appl. No. 11/560,181, filed Nov. 15, 2006, pp. 1-15.

* cited by examiner

METHODS AND SYSTEMS INCLUDING CO OXIDATION CATALYST WITH LOW NO TO NO₂ CONVERSION

TECHNICAL FIELD

Embodiments of the invention pertain generally to oxidation catalysts and systems and methods for oxidizing both ammonia ($NH_3$) and carbon monoxide (CO), and methods for their manufacture and use in stationary sources, including turbine exhausts.

BACKGROUND OF THE INVENTION

Much of the electrical power used in homes and businesses throughout the world is produced in power plants that burn a fossil fuel (i.e. coal, oil, or gas) in a boiler. The resulting hot exhaust gas (also sometimes termed "flue gas") turns a gas turbine or boils water to produce steam, which turns a steam turbine, and the turbine cooperates with a generator to produce electrical power. The flue gas stream is subsequently passed through an air preheater, such as a rotating wheel heat exchanger that transfers heat from the flue gas to an incoming air stream, which thereafter flows to the combustor. The partially cooled flue gas is directed from the air preheater to the exhaust stack.

The flue gas contains contaminants such as nitrogen oxide ($NO_x$) and carbon monoxide (CO) and particulates of soot when, for example, coal is used as the primary fuel source. The discharge of all of these contaminants into the atmosphere is subject to federal and local regulations, which greatly restrict the levels of these flue gas components.

To meet the reduced levels of $NO_x$ emissions from power stations required by environmental regulations, many fossil fuel-fired electric generating units are being equipped with selective catalytic reduction (SCR) catalysts. In SCR, the most common method used is to inject ammonia or urea based reagents in the presence of a vanadium oxide catalyst where the ammonia reacts to reduce the oxides of nitrogen. The SCR system typically operates at flue gas temperatures ranging between 300° C. and 450° C. U.S. Pat. No. 5,104,629 illustrates one known type of SCR installation.

In a typical power generation application, an oxidation catalyst is disposed upstream of the SCR catalyst for oxidation of the CO in the gas stream. The use of mixtures of $NO+NO_2$ produced upstream of the SCR catalyst in the oxidation catalyst allows other reactions to occur in addition to the standard SCR reaction:

$4 NH_3 + 4 NO + O_2 \rightarrow 4 N_2 + 6 H_2O$ (standard SCR reaction)  (1)

$4 NH_3 + 2 NO + 2 NO_2 \rightarrow 4 N_2 + 6 H_2O$ (fast SCR reaction)  (2)

$4 NH_3 + 3 NO_2 \rightarrow 3.5 N_2 + 6 H_2O$ (slow $NO_2$-SCR reaction)  (3).

Catalyst performance in SCR systems is affected by one or more of operating temperature, catalyst composition, space velocity, and molar ratio of $NH_3$ to inlet $NO_x$ fed to the SCR catalyst. Particularly, at lower temperatures, for example, below 300° C., conversion of NOx in the SCR catalyst is impacted by the $NO_2$ fraction of $NO_x$. This behavior can be attributed to the fast SCR reaction (2) with a reaction rate higher than the standard SCR reaction (1) at lower temperatures. The remaining NO or $NO_2$ reacts with ammonia according to the standard or $NO_2$-SCR reaction, yielding the reduction of $NO_x$ of these reactions at the actual conditions of temperature and space velocity. At higher $NO_2$ fractions, the reduction of NOx in the SCR catalyst decreases due to the different reaction rates of standard and $NO_2$-SCR. Beside this impact, high $NO_2$ fractions in the exhaust require more $NH_3$ to be introduced into the SCR process, which increases the possibility of $NH_3$ slip.

Typically, the oxidation catalyst upstream of the SCR catalyst in a power generation application consists of Pt or Pt/Pd on an alumina support washcoated onto a substrate such as a honeycomb or other suitable substrate. If NO to $NO_2$ conversion at the oxidation catalyst is not controlled and is too high, the performance of the downstream SCR catalyst will be impacted. The typical Pt or Pt/Pd on alumina support oxidation catalyst tends to age over time causing the NO to $NO_2$ conversion to increase. It would be desirable to provide an oxidation catalyst that provides acceptable CO conversion and acceptable levels of NO to $NO_2$ conversion over time and do not show aging. Moreover, it would be desirable to provide methods and systems that control the conversion of CO and $NO_x$ in power generation systems.

SUMMARY OF THE INVENTION

Aspects of the present invention include catalysts, catalyst systems, and methods for removing ammonia and/or carbon monoxide in flue gases where ammonia is used with a selective catalytic reduction catalyst for reducing oxides of nitrogen. In one aspect of the present invention, a stationary source oxidation catalyst is provided, the catalyst comprising platinum or platinum/palladium dispersed on a zirconia support.

In another embodiment, a catalyst system is provided where the catalyst is located on a substrate in the form of a honeycomb and adapted for use in a turbine exhaust stream. In one or more embodiments, the catalyst system comprises an oxidation catalyst comprising platinum or platinum/palladium and zirconia; an SCR catalyst downstream from the oxidation catalyst; and an ammonia source upstream of the SCR catalyst. Thus, according to one embodiment, a stationary source catalyst system for the treatment of an exhaust gas stream from a stationary power plant comprises an oxidation catalyst comprising particulate platinum dispersed on zirconia support particles, the oxidation catalyst being effective to convert no more than 20% NO to $NO_2$ in the exhaust gas stream from the power plant when the catalyst is fresh and after the catalyst has been exposed to a stationary power plant exhaust gas stream for up to at least one year and the particulate platinum having an average particle size less than about 10 nm when the catalyst is fresh and after the catalyst has been exposed to a stationary power plant exhaust gas stream for up to at least one year, the platinum having an SCR catalyst disposed downstream from the oxidation catalyst and an ammonia injection system located upstream from the SCR catalyst.

In one embodiment, the oxidation catalyst may further comprise palladium metal, and in a particular embodiment, the platinum and palladium are present in a ratio of platinum to palladium of up to about 1:1. According to one embodiment, the particulate platinum has an average particle size of less than about 5 nm when the catalyst is fresh and after the catalyst has been exposed to a stationary power plant exhaust gas stream for one year. In another embodiment, the particulate platinum has an average particle size of less than about 5 nm when the catalyst is fresh and after the catalyst has been exposed to a stationary power plant exhaust gas stream for two years.

In another embodiment, a catalyst system comprises: an oxidation catalyst consisting essentially of particulate platinum dispersed on zirconia particles, the particulate platinum having an average particle size less than about 10 nm when the catalyst is fresh and after the catalyst has been exposed to a stationary power plant exhaust gas stream for up to at least one year; a SCR catalyst located downstream from the oxidation catalyst; and an ammonia source upstream of the SCR catalyst.

In accordance with another aspect of the invention, there is provided a method of treating an exhaust gaseous stream containing at least $NO_x$, ammonia ($NH_3$), and carbon monoxide (CO), the method comprising contacting the gaseous stream with an oxidation catalyst comprising platinum or platinum/palladium dispersed on a zirconia support, injecting ammonia into the gaseous stream exiting the oxidation catalyst; and contacting the gaseous stream with an SCR catalyst. In a particular embodiment, a method of treating an exhaust gaseous stream of a stationary source containing at least ammonia ($NH_3$), NO, and carbon monoxide (CO) comprises contacting the gaseous stream an oxidation catalyst comprising particulate platinum dispersed on a zirconia support particles, the oxidation catalyst effective for converting less than about 20% of the NO to $NO_2$ in the exhaust gas stream when the catalyst is fresh and after the catalyst has been exposed to a stationary power plant exhaust gas stream for up to one year, the particulate platinum having an average particle size less than about 5 nm when the catalyst is fresh and after the catalyst has been exposed to a stationary power plant exhaust gas stream for up to one year; and passing the exhaust gas exiting the oxidation catalyst through an SCR catalyst.

In one embodiment, the temperature of the gaseous stream is from approximately 300° C. to approximately 500° C. In another embodiment, the method further comprises injecting ammonia upstream from the SCR catalyst.

These and other aspects of the invention will become apparent to those skilled in the art upon reading and understanding the following detailed description of the embodiments.

BRIEF DESCRIPTION OF THE DRAWINGS

The invention may take physical form in certain parts and arrangement of parts, the embodiments of which are described in detail and illustrated in the accompanying drawings which form a part hereof, and wherein.

DETAILED DESCRIPTION

Before describing several exemplary embodiments of the invention, it is to be understood that the invention is not limited to the details of construction or process steps set forth in the following description. The invention is capable of other embodiments and of being practiced in various ways.

Aspects of the present invention include catalysts, catalyst systems, and methods for removing ammonia and/or carbon monoxide in flue gases where ammonia is used with a selective catalytic reduction catalyst for reducing oxides of nitrogen. An oxidation catalyst is provided according to one aspect of the present invention. Generally, this oxidation catalyst comprises platinum or platinum/palladium on a zirconia support and is effective to oxidize ammonia ($NH_3$) and carbon monoxide (CO) when placed in an exhaust gas stream.

Other aspects of the present invention include catalyst systems which comprise a catalyst located on a substrate in the form of a honeycomb and adapted for use in a turbine exhaust stream. The system can further include an SCR catalyst.

In another aspect, a catalyst system is provided where the catalyst system comprises an SCR catalyst; an ammonia source upstream of the SCR catalyst; and an oxidation catalyst located upstream of the SCR catalyst, the oxidation catalyst comprising platinum or platinum/palladium dispersed on a zirconia support, the system being located in the exhaust stream of a stationary source and effective to substantially simultaneously oxidize ammonia ($NH_3$) and carbon monoxide (CO).

In accordance with another aspect of the invention, there is provided a method of treating an exhaust gaseous stream containing at least $NO_x$, ammonia ($NH_3$), and carbon monoxide (CO), the method comprising contacting the gaseous stream an oxidation catalyst comprising a platinum component dispersed on a zirconia support. In one embodiment, a temperature of the gaseous stream is from approximately 300° C. to approximately 500° C.

Substrates

In one or more embodiments, one or more catalyst compositions are disposed on a substrate. The substrate may be any of those materials typically used for preparing catalysts, and will preferably comprise a ceramic or metal honeycomb structure. Any suitable substrate may be employed, such as a monolithic substrate of the type having fine, parallel gas flow passages extending therethrough from an inlet or an outlet face of the substrate, such that passages are open to fluid flow therethrough (referred to as honeycomb flow through substrates). The passages, which are essentially straight paths from their fluid inlet to their fluid outlet, are defined by walls on which the catalytic material is coated as a washcoat so that the gases flowing through the passages contact the catalytic material. The flow passages of the monolithic substrate are thin-walled channels, which can be of any suitable cross-sectional shape and size such as trapezoidal, rectangular, square, sinusoidal, hexagonal, oval, circular, etc. Such structures may contain from about 60 to about 600 or more gas inlet openings (i.e., cells) per square inch of cross section.

The substrate can also be a wall-flow filter substrate, where the channels are alternately blocked, allowing a gaseous stream entering the channels from one direction (inlet direction), to flow through the channel walls and exit from the channels from the other direction (outlet direction). A dual oxidation catalyst composition can be coated on the wall-flow filter. If such substrate is utilized, the resulting system will be able to remove particulate matters along with gaseous pollutants. The wall-flow filter substrate can be made from materials commonly known in the art, such as cordierite or silicon carbide.

The ceramic substrate may be made of any suitable refractory material, e.g., cordierite, cordierite-alumina, silicon nitride, zircon mullite, spodumene, alumina-silica magnesia, zircon silicate, sillimanite, a magnesium silicate, zircon, petalite, alumina, an aluminosilicate and the like.

The substrates useful for the catalysts of the present invention may also be metallic in nature and be composed of one or more metals or metal alloys. The metallic substrates may be employed in various shapes such as corrugated sheet or monolithic form. Preferred metallic supports include the heat resistant metals and metal alloys such as titanium and stainless steel as well as other alloys in which iron is a substantial or major component. Such alloys may contain one or more of nickel, chromium and/or aluminum, and the total amount of these metals may advantageously comprise at least 15 wt. % of the alloy, e.g., 10-25 wt. % of chromium, 3-8 wt. % of aluminum and up to 20 wt. % of nickel. The alloys may also contain small or trace amounts of one or more other metals such as manganese, copper, vanadium, titanium and the like. The surface of the metal substrates may be oxidized at high temperatures, e.g., 1000° C. and higher, to improve the resistance to corrosion of the alloys by forming an oxide layer on the surfaces of the substrates. Such high temperature-induced oxidation may enhance the adherence of the refractory metal oxide support and catalytically promoting metal components to the substrate.

In alternative embodiments, one or more catalyst compositions may be deposited on an open cell foam substrate. Such substrates are well known in the art, and are typically formed of refractory ceramic or metallic materials.

Preparation of Washcoats

The catalyst compositions of the present invention may be readily prepared by processes well known in the prior art. It will be understood that the process below can be varied according to different embodiments of the invention to prepare single layer washcoats, by omitting the step of applying the second layer, or to add one or more additional layers to a bi-layer washcoat described below.

The catalyst composite can be readily prepared in one or more layers on a monolithic honeycomb substrate. The substrate may then be dipped one or more times in such slurry or the slurry may be coated on the substrate (e.g., honeycomb flow through substrate) such that there will be deposited on the substrate the desired loading of the metal oxide. Components such as stabilizers, promoters and the like may be incorporated in the slurry as a mixture of water soluble or water-dispersible compounds or complexes. Thereafter, the coated substrate is typically calcined by heating, e.g., at 400 to 600° C. for 1 to 3 hours.

According to one or more embodiments, the support particles for the precious metal comprise zirconia. The zirconia may be substantially pure, or alternatively, the zirconia may be doped or physically mixed with one or more secondary components. Examples of secondary components, include, but are not limited to ceria, yttria, lanthana and alumina.

In one or more embodiments, the slurry is comminuted to result in substantially all of the solids having particle sizes of less than 20 microns, e.g., 1-15 microns, in an average diameter. The comminution may be conducted in a ball mill or other similar equipment, and the solids content of the slurry may be, e.g., 20-60 wt. %, preferably 35-45 wt. %.

The washcoat loading on the substrate according to one or more embodiments are in the range of about 0.5 to 3 g/in$^3$ and, more specifically, in the range of about 1.0 to about 2.0 g/in$^3$. The platinum and platinum/palladium can be dispersed on the support particles using techniques known in the art. The loading of the precious metal on the substrate according to one or more embodiments is in the range of about 10 to 30 g/ft$^3$ and, more specifically, 10 to 20 g/ft$^3$. In specific embodiments, platinum is the only precious metal dispersed on the support particles. In other embodiments, palladium may also be dispersed on the support particles. When palladium is dispersed on the support particles, the ratio of platinum to palladium is in the range of up to about 1:1.

Figure 1:
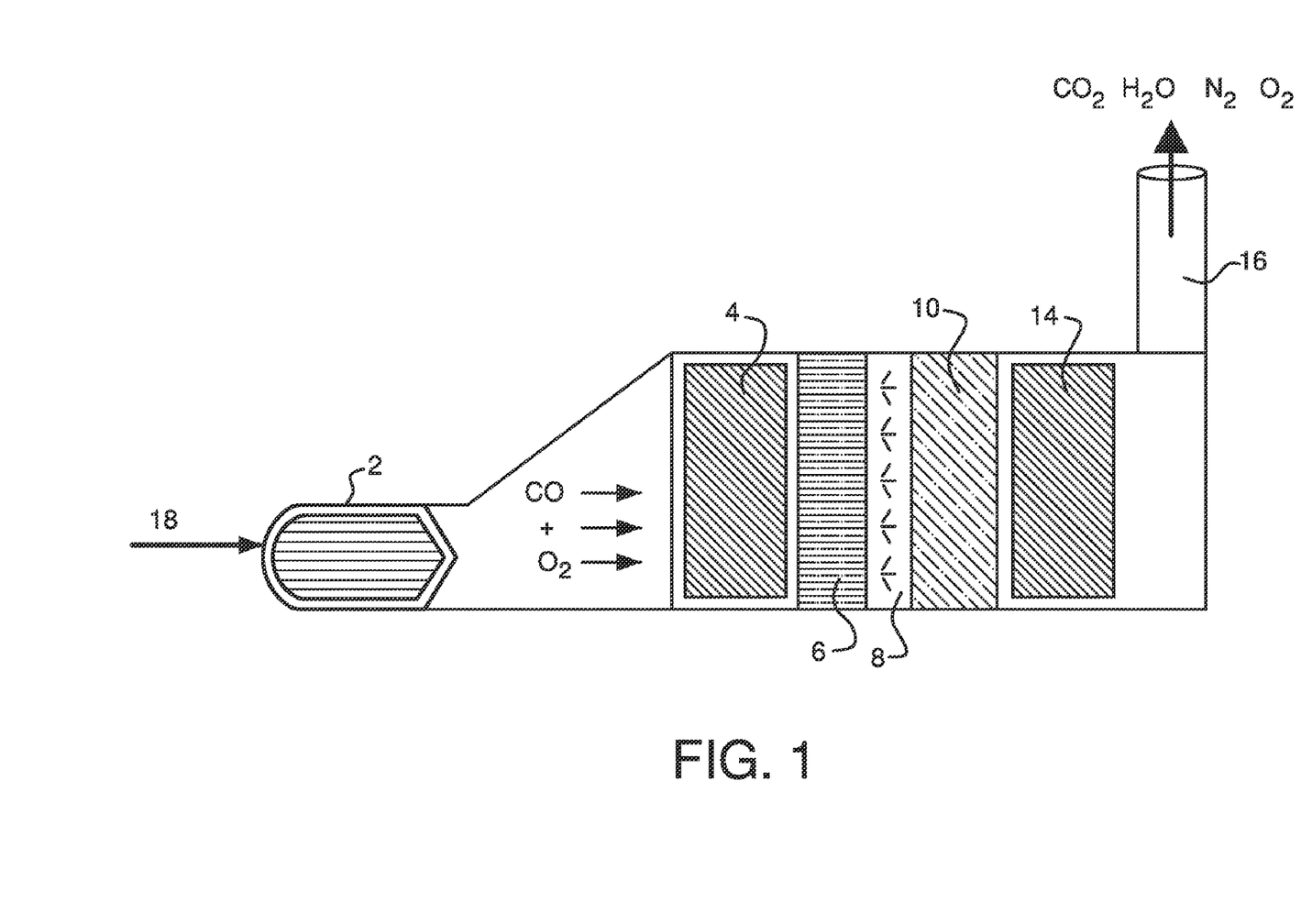
FIG. 1 is a depiction of a catalyst system for the exhaust of a cogeneration combined cycle gas turbine.

In FIG. 1, an example of a catalyst system for the exhaust of a cogeneration combined cycle gas turbine 2 is depicted. Air 18 is supplied to the system to combust the fuel, for example, coal or natural gas in the boiler (not shown). Hot exhaust gases including at least $O_2$ and CO exit from the turbine 2 (which, in response, turns a generator (not shown) to create electricity) and pass over a first heat recovery steam generator 4, where the heat from the exhaust gases is transferred to water thereby generating steam. An oxidation catalyst 6 as described above, for oxidizing, for example, carbon monoxide to carbon dioxide, is provided after the first heat recovery steam generator 4. An ammonia injection grid 8 is provided, so that ammonia can be used to reduce $NO_x$ in conjunction with an SCR catalyst 10. The exhaust gases pass over a second heat recovery steam generator 14 and then exit through a stack 16 to the atmosphere.

The following examples further illustrate the present invention, but of course, should not be construed as in any way limiting its scope.

EXAMPLES

Catalyst Preparation

Example 1

Synthesis of Pt/Zirconia catalyst: 46.23 g of platinum tetraamine hydroxide solution was diluted with 74.29 g of water. An amount of 200.87 g of commercially available zirconia powder was impregnated with the diluted platinum solution. The impregnated powder was then dried at about 110° C. overnight and then calcined at 500° C. for about 2 hours.

Example 2

Slurry preparation. An amount of 167 g of water was added to a 175 g of the powder described in Example 1. Then, an amount of 8.75 g of acetic acid and 0.09 g of N-2 octanol was added. The mixture was then ball milled to particle size so that about 90% of the particles were less than about 10 microns. Cores of 230 cells per square inch honeycombs were coated with the resulting slurry at 1.6 g/in$^3$ dry gain. The cores were dried at about 110° C. overnight and then calcined at about 500° C. for about 1 hour.

Comparative Example 3

Synthesis of platinum/alumina: 46.23 g of platinum tetraamine hydroxide solution was diluted with 74.29 g of water. 200.87 g SBA 150 alumina from Sasol was impregnated with the diluted platinum solution. The impregnated powder was then dried at about 110° C. overnight and then calcined for about 2 hours.

Comparative Example 4

Slurry preparation: 167 g of water was added to 175 g of the powder described in Example 3. An amount of 8.75 g of acetic acid and 0.09 g of N-2 octanol was added. The mixture was then ball milled to particle size so that about 90% of the particles were less than about 10 microns. Cores of 230 cells per square inch honeycombs were coated with the resulting slurry at 1.6 g/in$^3$ dry gain. Cores were dried at about 110° C. overnight and then calcined at about 500° C. for about 1 hour.

Example 5

Synthesis of Pt/Pd catalyst: 21 g of Pt tetraamine hydroxide, 7.31 g of Pd tetraamine hydroxide and 81 g of water were mixed together. An amount of 200 g of SBA 150 alumina was impregnated with the Pt/Pd mixture. The resulting powder was dried at about 100° C. overnight and then calcined at about 500° C. for about 2 hours.

Example 6

Slurry preparation: 167 g of water was added to a 175 g of the powder described in Example 5. An amount of 8.75 g of acetic acid and 0.09 g of N-2 Octanol was added. The mixture was then ball milled to particle size so that about 90% of the particles were less than about 10 microns. Cores of 230 cpsi honeycomb were coated with the resulting slurry at 1.6 g/in$^3$ dry gain. Cores were dried at about 110° C. overnight and then calcined at about 500° C. for about 1 hour.

Example 7

Testing: Cores prepared in Examples 2, 4 and 6 were evaluated in a test reactor under the following testing procedure. A simulated exhaust gas feedstream was passed through a sample of catalysts. The reactor system was instrumented with appropriate sensors, including a Fourier transform infrared spectrometer to determine CO concentration levels (and other species) entering/exiting the dual oxidation catalyst, and a flow meter to determine exhaust flow rate translatable to catalyst space velocity (SV). Space velocity represents a rate of feed of gas, in volume, per unit volume of the catalyst, and has a unit of inverse hour (hr$^{-1}$).

Space Velocity: 162,416 1/hr
F CO 25 ppm
NO 30 ppm
water: 3%
Temperature: 450° F.-800° F.

The % conversion of NO to NO$_2$ was calculated via equation 4:

% NO converted=[(inlet NO-outlet NO)/inlet NO]*100    eq (4).

Figure 2:
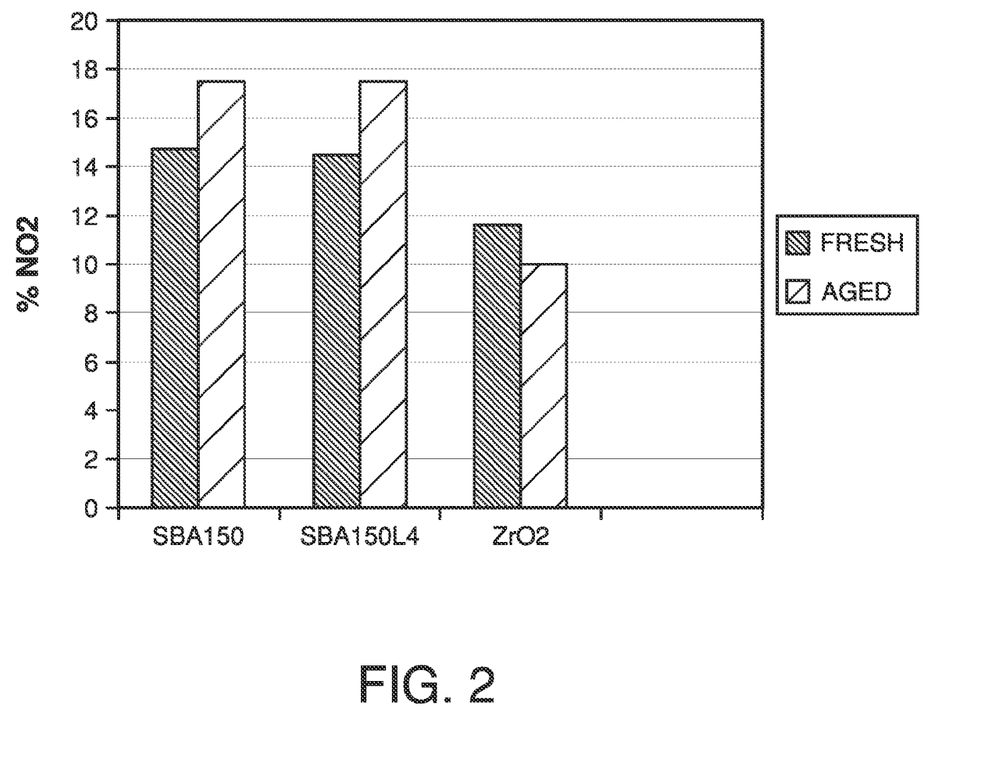
FIG. 2 is a graph comparing the conversion of CO to $CO_2$ for various catalysts.
Figure 3:
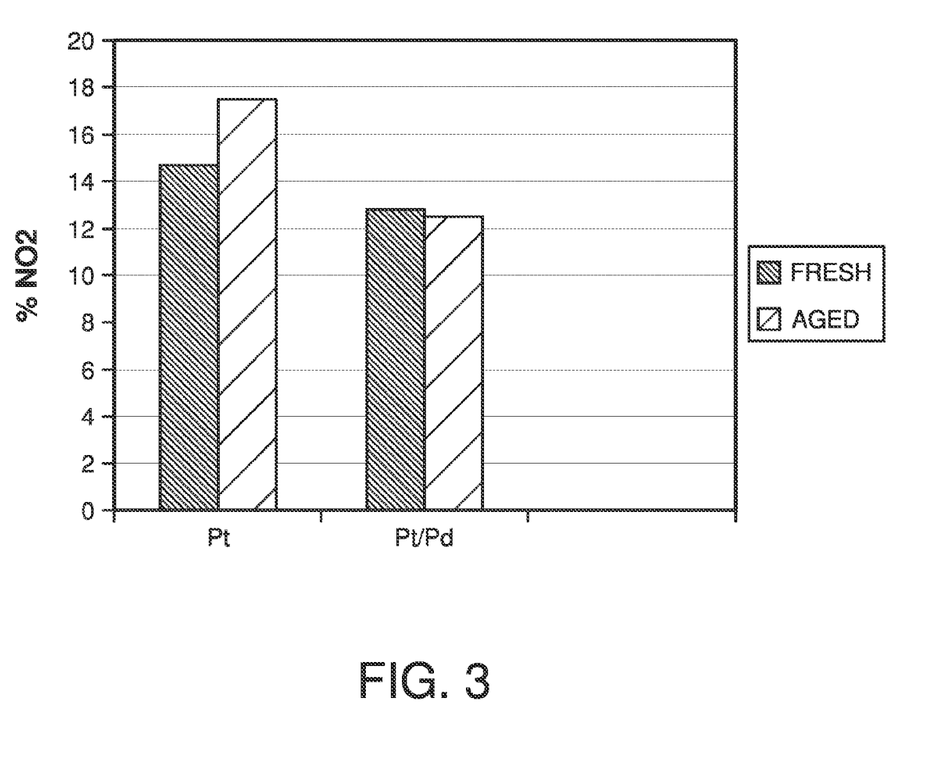
FIG. 3 is a graph comparing the conversion of CO to $CO_2$ after aging of catalysts for six months.

The results are shown in FIGS. 2 and 3. As shown in FIG. 2, the Pt on alumina sample produced in accordance with Example 4 showed increase NO to NO$_2$ conversion after aging due to Pt sintering. However, the Pt on Zr sample produced in accordance with Example 4 showed low NO to NO$_2$ conversion and no increase was observed after aging.

The samples were then aged in the field for 6 months in a natural gas turbine application where the emission contains 25 ppm Co,30 ppm NO, 10% water, 10% oxygen at 800° F. The Pt on Zr sample produced in accordance showed no deactivation and no increase in NO to NO$_2$ conversion. FIG. 3 shows that the NO to NO$_2$ conversion increases after aging for the platinum catalyst, where as the conversion remains the same. The aged sample was steam at 500° C. for 100 hours.

Example 7

Figure 4A:
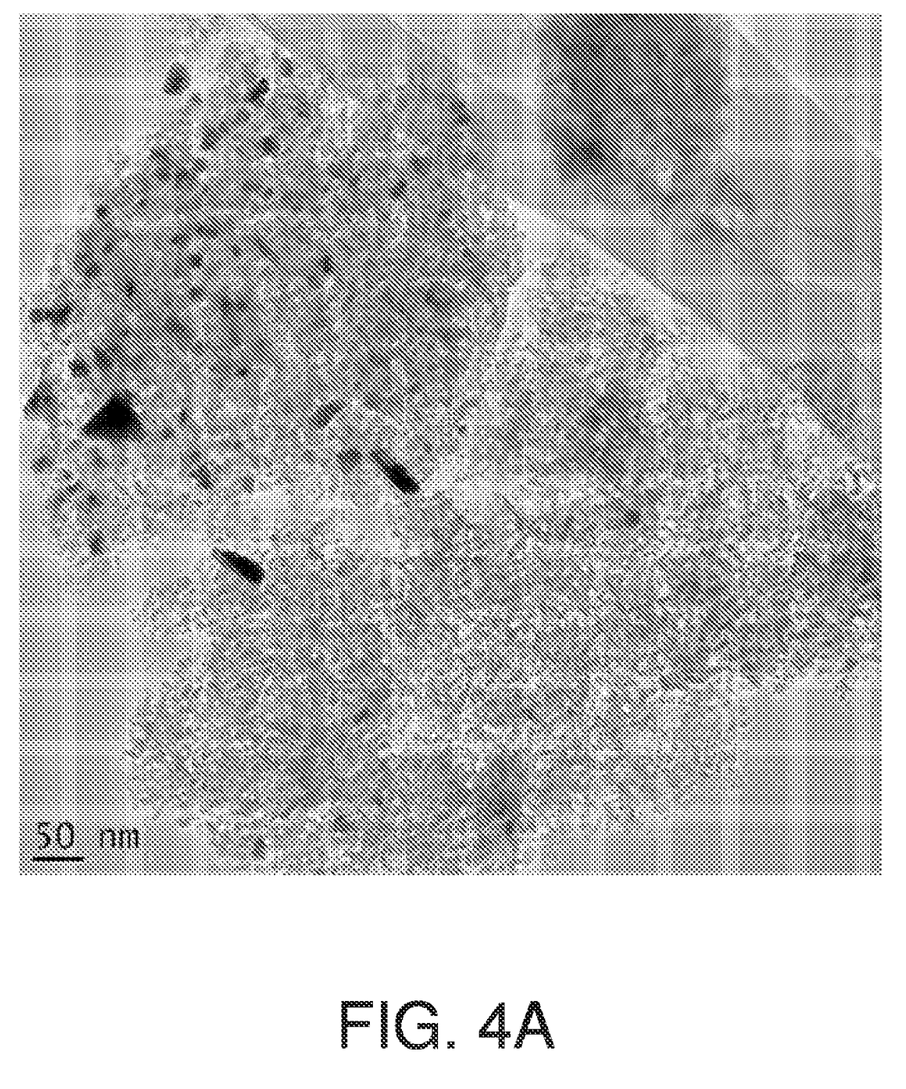
FIG. 4A is a TEM photograph of platinum particles on a conventional alumina support steam aged at 550° C. for 24 hours.
Figure 4B:
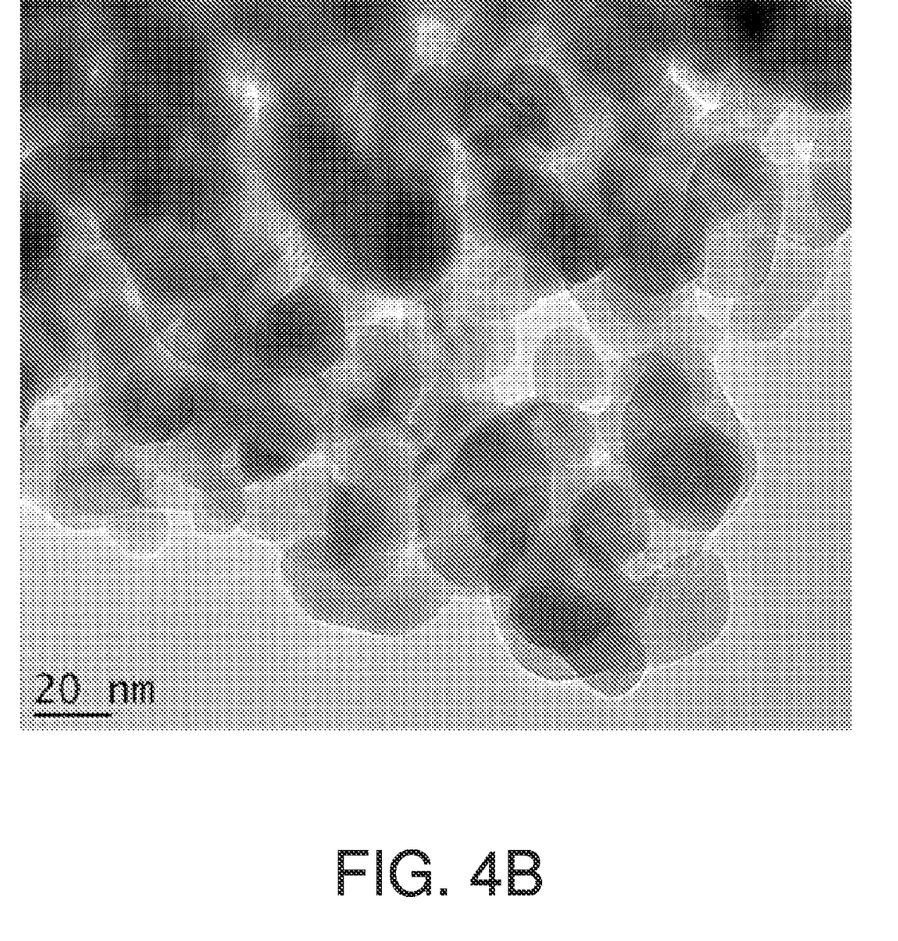
FIG. 4B is a TEM photograph of platinum particles on a zirconia support steam aged at 550° C. for 24 hours.

As shown in FIG. 4A, the platinum on alumina support after aging shows that the platinum particles (which appear as black in the TEM photograph) are relatively large, and some of the platinum particles approach ~50 nm in size. On the other hand, as shown in FIG. 4B, the platinum dispersed on zirconia support cannot be seen in the TEM picture, indicating that the platinum particles on the zirconia support are highly dispersed, even after aging. In FIG. 4B, the light and dark shadowed large particles are zirconia. The highly dispersed particles are less than the resolution of the TEM used to obtain the picture, meaning that the particles are less than about 10 nm in size, and more likely, less than 5 nm in size.

As demonstrated above, the Pt on zirconia catalysts according to an embodiment of the present invention do not degrade over time when placed in an exhaust gas stream of a stationary power plant. According to one or more embodiments, oxidation catalysts are effective to convert no more than about 20% NO to NO$_2$ when the catalyst is fresh and after use in a stationary power plant so that the catalyst is in contact with the exhaust gas stream for up to at least one year. In one or more embodiments, the catalysts are effective to convert no more than about 20% NO to NO$_2$ when the catalyst is fresh and after use in a stationary power plant so that the catalyst is in contact with the exhaust gas stream for up to at least two years, for example, five years.

The invention has been described with specific reference to the embodiments and modifications thereto described above. Further modifications and alterations may occur to others upon reading and understanding the specification. It is intended to include all such modifications and alterations insofar as they come within the scope of the invention.

What is claimed is:

1. A stationary source catalyst system for the treatment of an exhaust gas stream from a stationary power plant comprising an oxidation catalyst comprising particulate platinum dispersed on zirconia support particles, the oxidation catalyst being effective to convert no more than 20% NO to NO$_2$ in the exhaust gas stream from the power plant when the catalyst is fresh and after the catalyst has been exposed to a stationary power plant exhaust gas stream for up to at least one year and the particulate platinum having an average particle size less than about 10 nm when the catalyst is fresh and after the catalyst has been exposed to a stationary power plant exhaust gas stream for up to at least one year, the system having an SCR catalyst disposed downstream from the oxidation catalyst and an ammonia injection system located upstream from the SCR catalyst.

2. The catalyst system of claim 1, the oxidation catalyst further comprising palladium metal.

3. The catalyst system of claim 2, wherein the platinum and palladium are present in a ratio of platinum to palladium of up to about 1:1.

4. The catalyst system of claim 1, the oxidation catalyst being disposed on a substrate in the form of a honeycomb and adapted for use in a turbine exhaust stream.

5. The catalyst system of claim 1, wherein the particulate platinum has an average particle size of less than about 5 nm when the catalyst is fresh and after the catalyst has been exposed to a stationary power plant exhaust gas stream for one year.

6. The catalyst system of claim 1, wherein the particulate platinum has an average particle size of less than about 5 nm when the catalyst is fresh and after the catalyst has been exposed to a stationary power plant exhaust gas stream for two years.

7. A catalyst system comprising:
   an oxidation catalyst consisting essentially of particulate platinum dispersed on zirconia particles, the particulate platinum having an average particle size less than about 10 nm when the catalyst is fresh and after the catalyst has been exposed to a stationary power plant exhaust gas stream for up to at least one year;
   a SCR catalyst located downstream from the oxidation catalyst; and
   an ammonia source located upstream of the SCR catalyst.

8. The catalyst system of claim 7, wherein the particulate platinum has an average particle size of less than about 5 nm when the catalyst is fresh and after the catalyst has been exposed to a stationary power plant exhaust gas stream for two years.

9. The catalyst system of claim 8, the oxidation catalyst being disposed on a substrate in the form of a honeycomb and adapted for use in a turbine exhaust stream.

10. The catalyst system of claim 8, the oxidation catalyst further comprising palladium metal.

11. The catalyst system of claim 10, wherein the platinum and palladium are present in a ratio of platinum to palladium of up to about 1:1.

* * * * *